US011922448B2

(12) United States Patent
Dao et al.

(10) Patent No.: US 11,922,448 B2
(45) Date of Patent: Mar. 5, 2024

(54) SYSTEMS AND METHODS FOR FACILITATING INTENT-BASED ADVERTISING AND OFFERS

(71) Applicant: JPMORGAN CHASE BANK, N.A., New York, NY (US)

(72) Inventors: Tuan Dao, Richardson, TX (US); Howard Spector, Street, MD (US); Ralph Darmo, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/655,700

(22) Filed: Mar. 21, 2022

(65) Prior Publication Data

US 2022/0207554 A1 Jun. 30, 2022

Related U.S. Application Data

(60) Division of application No. 16/845,937, filed on Apr. 10, 2020, now abandoned, which is a (Continued)

(51) Int. Cl.
*G06Q 30/02* (2023.01)
*G06Q 30/0207* (2023.01)
*G06Q 30/0251* (2023.01)

(52) U.S. Cl.
CPC ..... *G06Q 30/0224* (2013.01); *G06Q 30/0255* (2013.01)

(58) Field of Classification Search
CPC ................ G06Q 30/0224; G06Q 30/0255
See application file for complete search history.

(56) References Cited

U.S. PATENT DOCUMENTS 9,648,581 B1 * 5/2017 Vaynblat ............... H04L 67/535
10,554,817 B1 * 2/2020 Sullivan .............. H04L 41/5054
(Continued)

FOREIGN PATENT DOCUMENTS

WO 2016025291 2/2016

OTHER PUBLICATIONS

International Search Report, dated Jul. 6, 2020, from corresponding International Application No. PCT/US2020/027729.
(Continued)

*Primary Examiner* — Scott C Anderson
(74) *Attorney, Agent, or Firm* — GREENBERG TRAURIG LLP

(57) ABSTRACT

In supply-side information processing apparatus comprising at least one computer processor, a method for providing a user with intent-based ads may include: (1) receiving, from an intent broker, intent identifiers for intent categories of user intents; (2) communicating the intent identifiers to a demand-side platform, the demand-side platform comprising a plurality of advertisers and merchants; (3) receiving, from a supply-side SDK on a user electronic device, personal data for a user, wherein the supply-side SDK captures the personal data from a publisher application executed on the user electronic device; (4) retrieving, based on the personal data and from the intent broker, a user intent identifier for the user, the user intent identifier matching one of the intent categories; (5) communicating the user intent identifier to the supply-side SDK, wherein the supply-side SDK requests an intent-based ad from the demand-side platform using the user intent identifier.

18 Claims, 17 Drawing Sheets

Related U.S. Application Data continuation-in-part of application No. 16/844,560, filed on Apr. 9, 2020.

(60) Provisional application No. 62/833,417, filed on Apr. 12, 2019.

(56) References Cited

U.S. PATENT DOCUMENTS

| | | |
|---|---|---|
| 2013/0346302 A1 | 12/2013 | Purves et al. |
| 2014/0207575 A1 | 7/2014 | Freed-Finnegan et al. |
| 2016/0078490 A1* | 3/2016 | Tumen ............... G06Q 30/0269 |
| | | 705/14.66 |
| 2017/0063551 A1* | 3/2017 | Quinn ................... H04L 9/0643 |
| 2019/0073697 A1* | 3/2019 | Varley ................ G06Q 30/0276 |
| 2019/0116239 A1* | 4/2019 | Jagannath ........... H04L 41/0896 |

OTHER PUBLICATIONS

Written Opinion of the International Searching Authority, dated Jul. 6, 2020, from corresponding International Application No. PCT/US2020/027729.

\* cited by examiner

SYSTEMS AND METHODS FOR FACILITATING INTENT-BASED ADVERTISING AND OFFERS

CROSS-REFERENCE TO RELATED APPLICATION

This application is a continuation of U.S. patent application Ser. No. 16/845,937, filed Apr. 10, 2020, which is a Continuation-in-Part of U.S. patent application Ser. No. 16/844,560, filed Apr. 9, 2020, which claims the benefit of U.S. Provisional Patent Application Ser. No. 62/833,417, filed Apr. 12, 2019, the disclosure of each of which is hereby incorporated by reference in its entirety.

BACKGROUND

1. Field of the Disclosure

This technology generally relates to methods and systems for facilitating consumer transactions, and more particularly, to systems and methods for providing an instrument that facilitates advertising and offers based on a user's intent with respect to a proposed event or experience.

2. Background Information

Consumers regularly engage in experiences, such as attending an event, traveling to a destination, or making a purchase of goods. Often, the ability to engage in the experience involves conducting financial transactions. Typically, when a consumer is interested in engaging in an experience, the consumer may search for information that is relevant to engaging in the experience, such as, for example, searching for tickets to a performance on a particular date, searching for flights to a destination and/or information about hotel room rates and availability at the destination, or searching for prices of goods from various merchants. Then, when the consumer makes decisions regarding the potential experience, one or more financial transactions may be executed. Each such transaction may involve the consumer, a merchant, and a financial institution, such as a bank, at which the consumer has an account from which a payment may be made.

Merchants and financial institutions are interested in participating in such transactions to the greatest extent possible, and as a result, incentives are offered to consumers to do business with the merchants and/or with the involvement of the financial institutions. However, such incentives may be provided without prior knowledge about the consumer's interest in engaging in a particular experience, thereby reducing the effectiveness of the offered incentives. In this regard, there is a need for a method that uses a consumer's intention to engage in an experience to more fittingly serve the consumer's intent, in order to increase the ability of merchants and financial institutions to participate in such transactions.

SUMMARY

The present disclosure, through one or more of its various aspects, embodiments, and/or specific features or sub-components, provides, inter alia, various systems, servers, devices, methods, media, programs, and platforms for implementing a provision of an instrument that facilitates transactions based on a user's intent with respect to a proposed event or experience.

According to an aspect of the present disclosure, a method for facilitating a transaction is provided. The method is implemented by at least one processor. The method includes: obtaining, from a user by the at least one processor, first information that relates to a proposed experience that is based on an expressed intention of the user; using, by the at least one processor, the first information to determine at least one proposed user benefit that relates to at least one proposed transaction with a merchant; providing, to the user by the at least one processor, second information that relates to the at least one proposed user benefit; and providing, to the user by the at least one processor, an instrument that is configured to facilitate a performance of the at least one transaction.

The instrument may include at least one from among a physical card and a digital token, which may be used by the user throughout the proposed experience.

The providing of the instrument may include connecting the instrument to an account that is associated with the user, such that when the user uses the instrument for conducting a transaction, the at least one proposed user benefit is automatically applied.

The method may further include preloading, by the at least one processor, the instrument with the second information, such that the providing of the instrument further includes providing the instrument together with the preloaded second information.

The obtaining of the first information may include using historical transaction information that relates to prior transactions that have been executed by the user.

The obtaining of the first information may include using historical search engine information that relates to prior Internet searches that have been executed by the user.

The obtaining of the first information may include using social media information that relates to prior postings that have been executed by the user.

The providing of the second information may include transmitting at least one from among a text message and an email message to a mobile device associated with the user.

The proposed experience may relate to at least one from among traveling to a destination, attending an event, and purchasing consumer goods.

When the proposed experience relates to traveling to a destination, the first information may include at least one from among a purchase of a ticket for an airline flight to the destination, a making of a reservation for a hotel room at the destination, and a purchase of a ticket to an event at the destination.

According to another aspect of the present disclosure, a computing apparatus for facilitating a transaction is provided. The computing apparatus includes a processor, a memory, and a communication interface coupled to each of the processor and the memory. The processor is configured to: obtain, from a user via the communication interface, first information that relates to a proposed experience that is based on an expressed intention of the user; use the first information to determine at least one proposed user benefit that relates to at least one proposed transaction with a merchant; provide, to the user via the communication interface, second information that relates to the at least one proposed user benefit; and provide, to the user via the communication interface, an instrument that is configured to facilitate a performance of the at least one transaction.

The instrument may include at least one from among a physical card and a digital token, which may be used by the user throughout the proposed experience.

The processor may be further configured to connect the instrument to an account that is associated with the user, such that when the user uses the instrument for conducting a transaction, the at least one proposed user benefit is automatically applied.

The processor may be further configured to preload the instrument with the second information, such that the instrument is provided to the user together with the preloaded second information.

The processor may be further configured to obtain the first information by using historical transaction information that relates to prior transactions that have been executed by the user.

The processor may be further configured to obtain the first information by using historical search engine information that relates to prior Internet searches that have been executed by the user.

The processor may be further configured to obtain the first information by using social media information that relates to prior postings that have been executed by the user.

The processor may be further configured to provide the second information to the user by transmitting at least one from among a text message and an email message via the communication interface to a mobile device associated with the user.

The proposed experience may relate to at least one from among traveling to a destination, attending an event, and purchasing consumer goods.

When the proposed experience relates to traveling to a destination, the first information may include at least one from among a purchase of a ticket for an airline flight to the destination, a making of a reservation for a hotel room at the destination, and a purchase of a ticket to an event at the destination.

According to another embodiment, in an intent broker information processing apparatus comprising at least one computer processor, a method for providing direct to user intent-based offers may include: (1) pre-arranging, with a plurality of merchants, intent-based offers or discounts; (2) receiving, from the user, a user intent; (3) identifying a pre-arranged intent-based offer or discount for the user by combining the user intent with at least one of a user profile, a user transaction history, and a merchant history; and (4) communicating, to user, the intent-based offer.

In one embodiment, the user intent may be received on a website or at a computer application.

In one embodiment, the method may further include refining the intent-based offers or discounts based on the user intent and intents of other users;

In one embodiment, the pre-arranged intent-based offer or discount may be further identified based on transactions with other users.

In one embodiment, the intent-based offer or discount may be communicated to a computer application executed by an electronic device associated with the user.

In one embodiment, the intent-based offer or discount may be communicated as a push notification.

According to another embodiment, in supply-side information processing apparatus comprising at least one computer processor, a method for providing a user with intent-based ads may include: (1) receiving, from an intent broker, intent identifiers for intent categories of user intents; (2) communicating the intent identifiers to a demand-side platform, the demand-side platform comprising a plurality of advertisers and merchants; (3) receiving, from a supply-side SDK on a user electronic device, personal data for a user, wherein the supply-side SDK captures the personal data from a publisher application executed on the user electronic device; (4) retrieving, based on the personal data and from the intent broker, a user intent identifier for the user, the user intent identifier matching one of the intent categories; (5) communicating the user intent identifier to the supply-side SDK, wherein the supply-side SDK requests an intent-based ad from the demand-side platform using the user intent identifier.

In one embodiment, the method may further include receiving, from one of the advertisers or merchants, an ad bid or buy matching the user intent identifier; retrieving ad content for the matching ad bid or buy from an advertiser or merchant ad server; and sending the ad content to the supply-side SDK, wherein the SDK causes the publisher application to display the ad content to the user.

In one embodiment, the method may further include identifying the user based on the personal data.

In one embodiment, the personal data comprises at least one of user data and application usage data.

In one embodiment, the method may further include enriching the user intent with at least one of payment card analytics, user profile data, transaction history data, general demographic data, and data from merchants.

In one embodiment, the user intent identifier may be based on a direct intent provided by the user.

According to another embodiment, in supply-side information processing apparatus comprising at least one computer processor, a method for providing direct to user intent-based offers may include: (1) receiving, from an intent broker, intent identifiers for intent-based offers or discounts; (2) communicating the intent identifiers to a demand-side platform, the demand-side platform comprising a plurality of advertisers and merchants; (3) receiving, from a publisher script embedded in a browser on a user electronic device, personal data for a user; (4) retrieving, from the intent broker, a user intent identifier for the user; and (5) communicating the user intent identifier to the publisher script, wherein the publisher script requests an intent-based offer or discount from the demand-side platform using the user intent identifier.

In one embodiment, the method may further include receiving, from one of the advertisers or merchants, an ad bid or buy matching the user intent identifier; retrieving ad content for the matching ad bid or buy from an advertiser or merchant ad server; and sending the ad content to the publisher script, wherein the publisher script causes the browser to display the ad content to the user.

In one embodiment, the method may further include identifying the user based on the personal data.

In one embodiment, the personal data comprises at least one of user data and browsing data.

In one embodiment, the method may further include enriching the user intent with at least one of payment card analytics, user profile data, transaction history data, general demographic data, and data from merchants.

In one embodiment, the user intent identifier may be based on a direct intent provided by the user.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
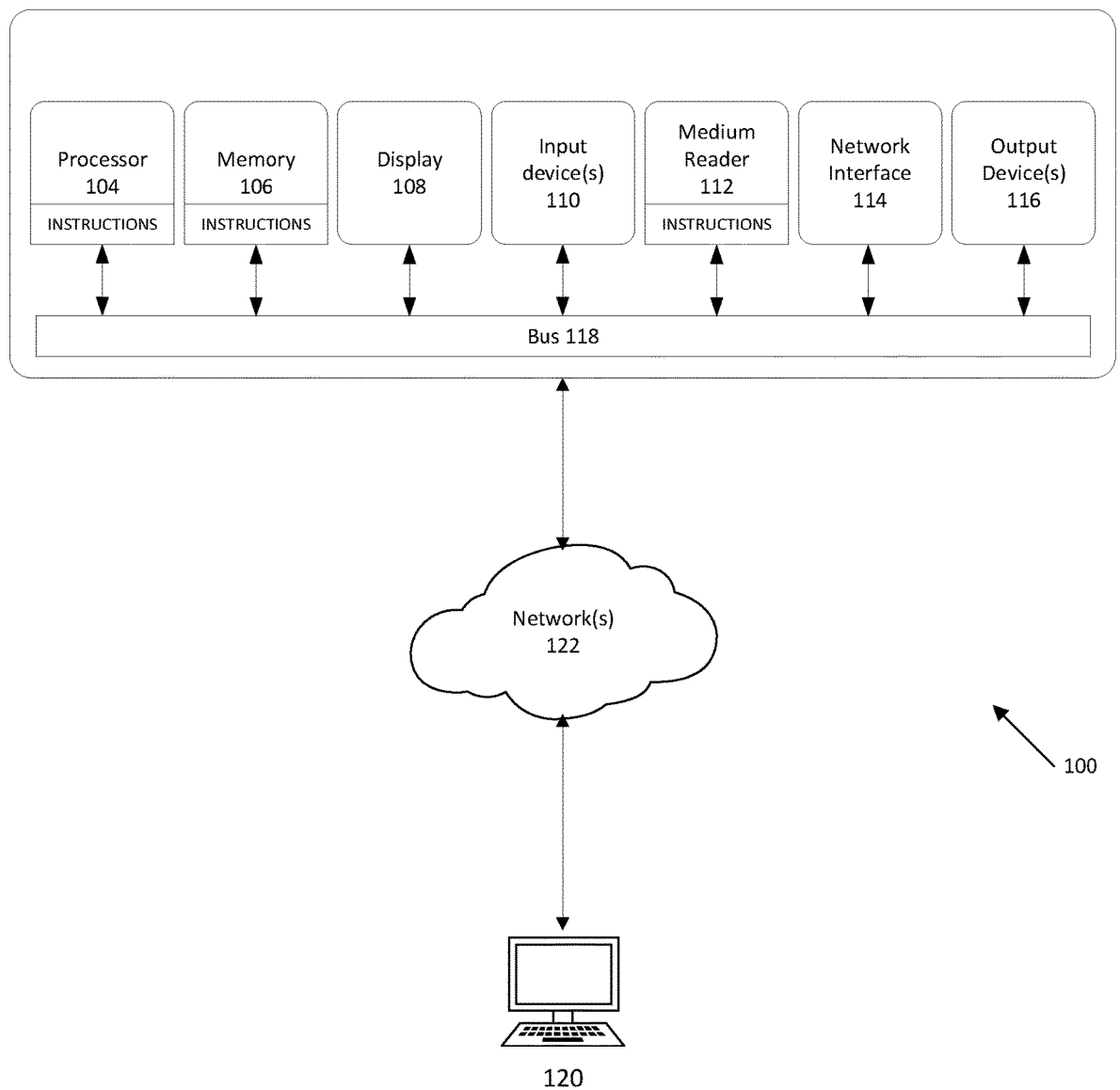
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an instrument that facilitates transactions and user benefits based on a user's intent with respect to a proposed event or experience.

Figure 2:
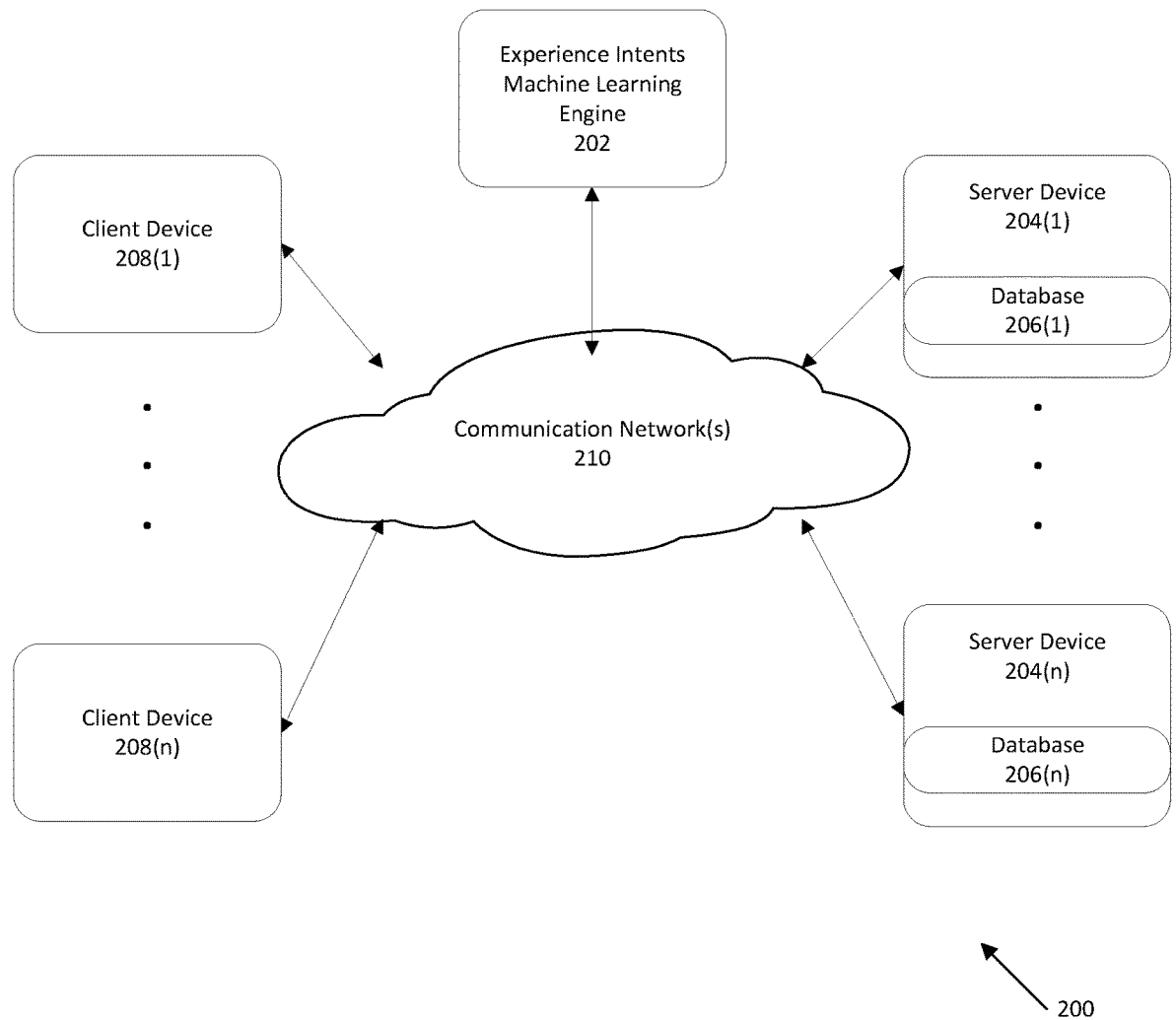
FIG. 2 illustrates an exemplary diagram of a network environment.

Referring to FIG. 2, a schematic of an exemplary network environment 200 for implementing a method for providing an instrument that facilitates transactions and user benefits based on a user's intent with respect to a proposed event or experience is illustrated. In an exemplary embodiment, the method is executable on any networked computer platform, such as, for example, a wireless mobile communication device, e.g., a smart phone.

The provision of an instrument that facilitates transactions based on a user's intent with respect to a proposed event or experience may be implemented by an Experience Intents Machine Learning Engine (EIMLE) device 202. The EIMLE device 202 may be the same or similar to the computer system 102 as described with respect to FIG. 1. The EIMLE device 202 may store one or more applications that can include executable instructions that, when executed by the EIMLE device 202, cause the EIMLE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EIMLE device 202 itself, may be located in virtual server(s) running in a cloud-based computing environment rather than being tied to one or more specific physical network computing devices. Also, the application(s) may be running in one or more virtual machines (VMs) executing on the EIMLE device 202. Additionally, in one or more embodiments of this technology, virtual machine(s) running on the EIMLE device 202 may be managed or supervised by a hypervisor.

In the network environment 200 of FIG. 2, the EIMLE device 202 is coupled to a plurality of server devices 204(1)-204(n) that hosts a plurality of databases 206(1)-206(n), and also to a plurality of client devices 208(1)-208(n) via communication network(s) 210. A communication interface of the EIMLE device 202, such as the network interface 114 of the computer system 102 of FIG. 1, operatively couples and communicates between the EIMLE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EIMLE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and EIMLE devices that efficiently implement a provision of an instrument that facilitates transactions and user benefits based on a user's intent with respect to a proposed event or experience.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EIMLE device 202 may be a standalone device or integrated with one or more other devices or apparatuses, such as one or more of the server devices 204(1)-204(n), for example. In one particular example, the EIMLE device 202 may include or be hosted by one of the server devices 204(1)-204(n), and other arrangements are also possible. Moreover, one or more of the devices of the EIMLE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EIMLE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user-specific data, such as user account data and historical transaction data, and merchant-specific data, such as information about proposed consumer transactions having discounted prices.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the EIMLE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, e.g., a smart phone. In an exemplary embodiment, at least one client device 208 is a computer terminal that is located at a place of business, such as, for example, a bank retail location, where a user may express intent by simply telling an employee of the business, such as, for example, a bank representative, and the employee may then use the client device 208 to indicate the user's expressed intent.

The client devices 208(1)-208(n) may run interface applications, such as standard web browsers or standalone client applications, which may provide an interface to communicate with the EIMLE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the EIMLE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EIMLE device 202, the server devices 204(1)-204(n), or the client devices 208(1)-208(n), for example, may be configured to operate as virtual instances on the same physical machine. In other words, one or more of the EIMLE device 202, the server devices 204(1)-204(n), or the client devices 208(1)-208(n) may operate on the same physical device rather than as separate devices communicating through communication network(s) 210. Additionally, there may be more or fewer EIMLE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
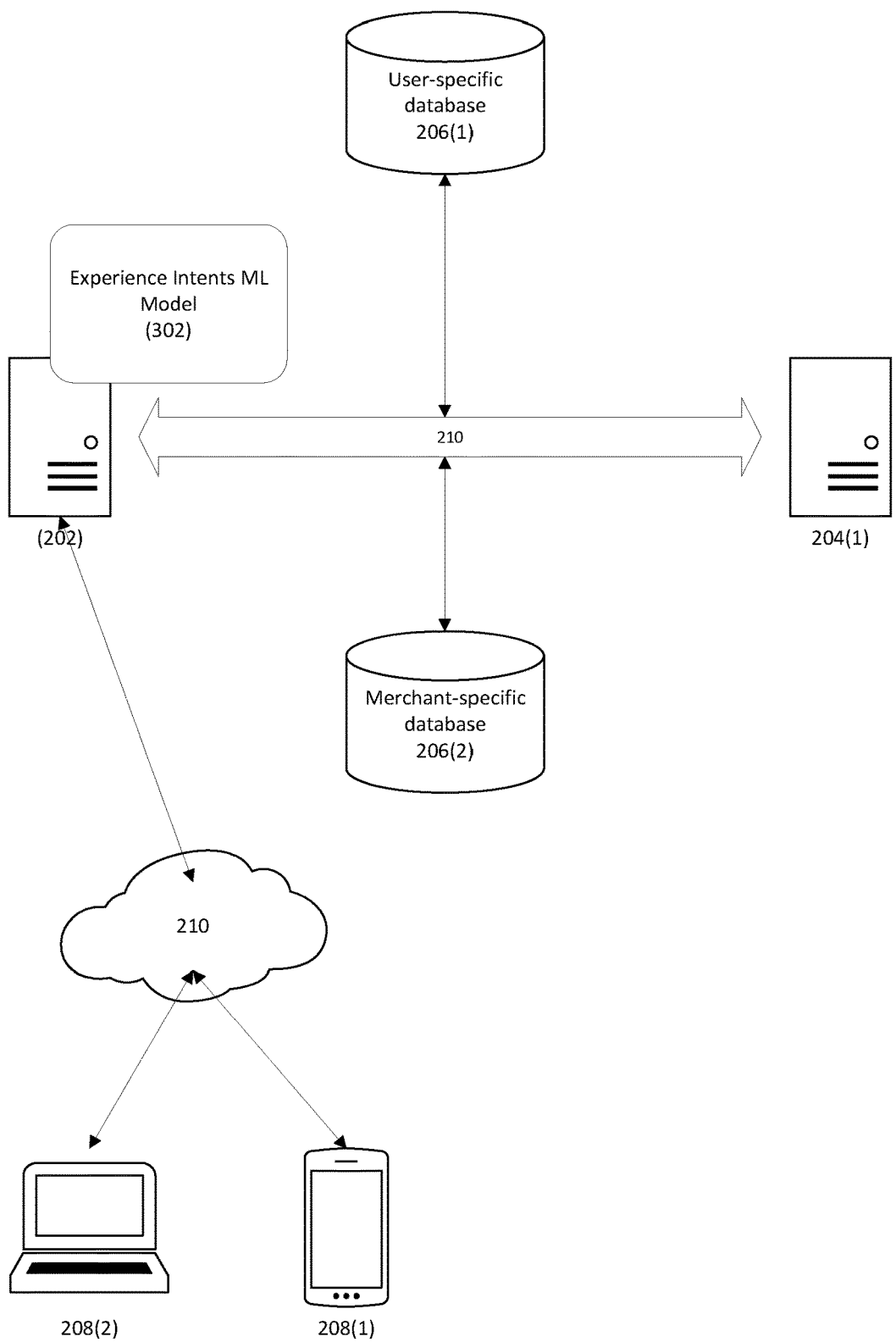
FIG. 3 shows an exemplary system for implementing a method for providing an instrument that facilitates transactions based on a user's intent with respect to a proposed event or experience.

The EIMLE device 202 is described and shown in FIG. 3 as including an experience intents machine learning (ML) module 302, although it may include other rules, policies, modules, databases, or applications, for example. As will be described below, the experience intents ML module 302 is configured to implement a provision of an instrument that facilitates transactions and user benefits based on a user's intent with respect to a proposed event or experience in an automated, efficient, scalable, and reliable manner.

An exemplary process for implementing a provision of an instrument that facilitates transactions and user benefits based on a user's intent with respect to a proposed event or experience by utilizing the network environment of FIG. 2 is shown as being executed in FIG. 3. Specifically, a first client device 208(1) and a second client device 208(2) are illustrated as being in communication with EIMLE device 202. In this regard, the first client device 208(1) and the second client device 208(2) may be "clients" of the EIMLE device 202 and are described herein as such. Nevertheless, it is to be known and understood that the first client device 208(1) and/or the second client device 208(2) need not necessarily be "clients" of the EIMLE device 202, or any entity described in association therewith herein. Any additional or alternative relationship may exist between either or both of the first client device 208(1) and the second client device 208(2) and the EIMLE device 202, or no relationship may exist.

Further, EIMLE device 202 is illustrated as being able to access a user-specific database 206(1) and a merchant-specific database 206(2). The experience intents ML module 302 may be configured to access these databases for implementing a provision of an instrument that facilitates transactions and user benefits based on a user's intent with respect to a proposed event or experience.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the EIMLE device 202 via broadband or cellular communication. Of course, these embodiments are merely exemplary and are not limiting or exhaustive.

Figure 4:
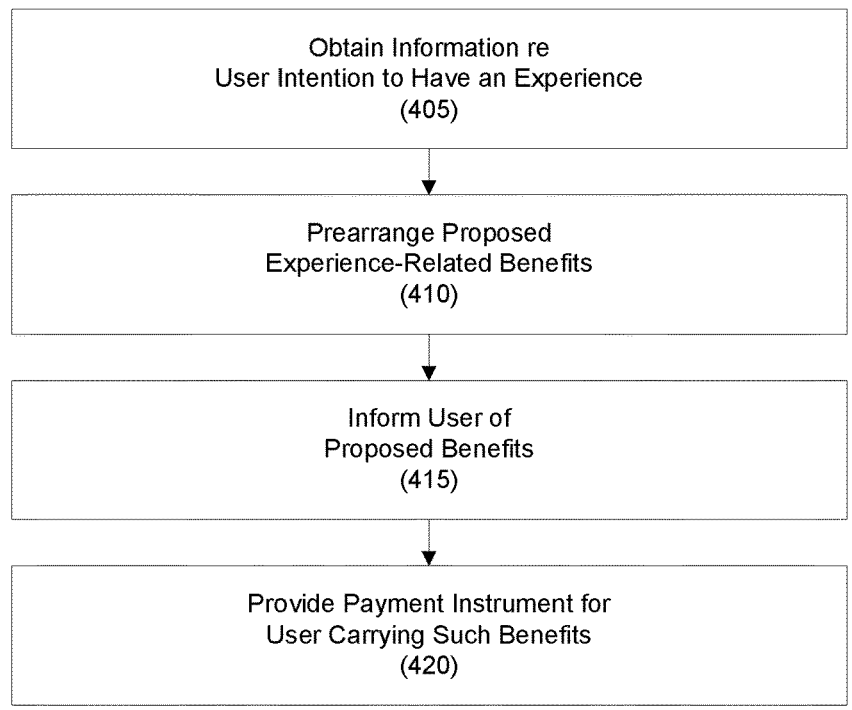
FIG. 4 is a flowchart of an exemplary process for implementing a method for providing an instrument that facilitates transactions based on a user's intent with respect to a proposed event or experience.

Upon being started, the experience intents ML module 302 executes a process for provision of an instrument that facilitates transactions and user benefits based on a user's intent with respect to a proposed event or experience. An exemplary process for implementing a provision of an instrument that facilitates transactions and user benefits based on a user's intent with respect to a proposed event or experience is generally indicated provided in FIG. 4.

In step 405, information that relates to a user's intention to have an experience is obtained. In this context, the term "experience" may broadly refer to any type of experience in which the user may wish to participate, such as, for example, traveling to a destination, attending an event, or purchasing consumer goods.

User intention information may be obtained in many different ways. For example, a user may directly express an intention to have an experience by transmitting a message, such as a text message, and email, or an in-person communication, to that effect. As another example, the user may make a purchase that indicates an intention to engage in an experience. In this aspect, if the user purchases a ticket for an airline flight from Washington, D.C. to New York City, or if the user makes a reservation for a hotel room at a New York City hotel, or if the user purchases a ticket to a Broadway show, then the user's intention to travel to New York City is indicated by any or all of these purchases.

As another example, the user may perform Internet searches that indicate an intention to engage in an experience. In particular, if the user searches for airline flights from Washington, D.C. to New York City, or if the user searches for hotel room rates and availabilities at New York City hotels, or if the user searches for tickets to one or more Broadway shows, then the user's intention to travel to New York City is indicated by any or all of these searches.

As yet another example, the user may use social media to express an intention to engage in an experience. In particular, if the user posts a message on Facebook, Twitter, Instagram, or any other social media platform, and if the message indicates that the user desires to visit New York City on a particular weekend, then the user's intention to travel to New York City is indicated by such a post.

As still another example, historical data that relates to the user's prior experiences may suggest a potential future intention to engage in an experience. In this aspect, if the user has traveled to New York City eight times in the last five years, and on each such occasion, the user has attended a Broadway show, then a potential future intention to travel to New York City may be indicated by such historical data.

At step 410, the experience intents ML module uses the obtained user intention information to generate offers and proposed user benefits that relate to the experience in which the user intends to engage. For example, if the user has indicated an intention to travel to New York City to attend a Broadway show, the experience intents machine learning module 302 may generate an offer to stay at a particular New York City hotel, and may also generate an offer to attend "The Lion King". In particular, if the EIMLE device is owned by a financial institution that has prearranged with specific merchants for discounted deals on hotel rooms and Broadway shows, information that relates to the prearranged offers may be stored in the merchant-specific database, and the experience intents ML module may use the user intention information to determine which stored information within the merchant-specific database would likely be of interest to the user, in order to generate offers and proposed user benefits.

At step 415, the experience intents ML module informs the user of the offers and proposed benefits. For example, a text message may be sent to the user's smart phone 208(1), or an email message may be transmitted to the user.

At step 420, a payment instrument for facilitating an execution of transactions relating to the intended experience is provided to the user. In an exemplary embodiment, a physical card that may be provided to the user. Alternatively, a digital token may be provided to the user. In either case, the experience intents ML module may ensure that the instrument is connected to a user account via which payments may be made automatically, and may also ensure that the instrument includes any information that relates to the proposed offers and user benefits and other experience-related information. In this manner, the instrument serves the user's purpose of realizing the proposed benefits and facilitating the performance of transactions that are related to the experience, and also serves the purposes of each of the merchants involved in the transactions and the financial institution that is facilitating the transactions.

Figure 5:
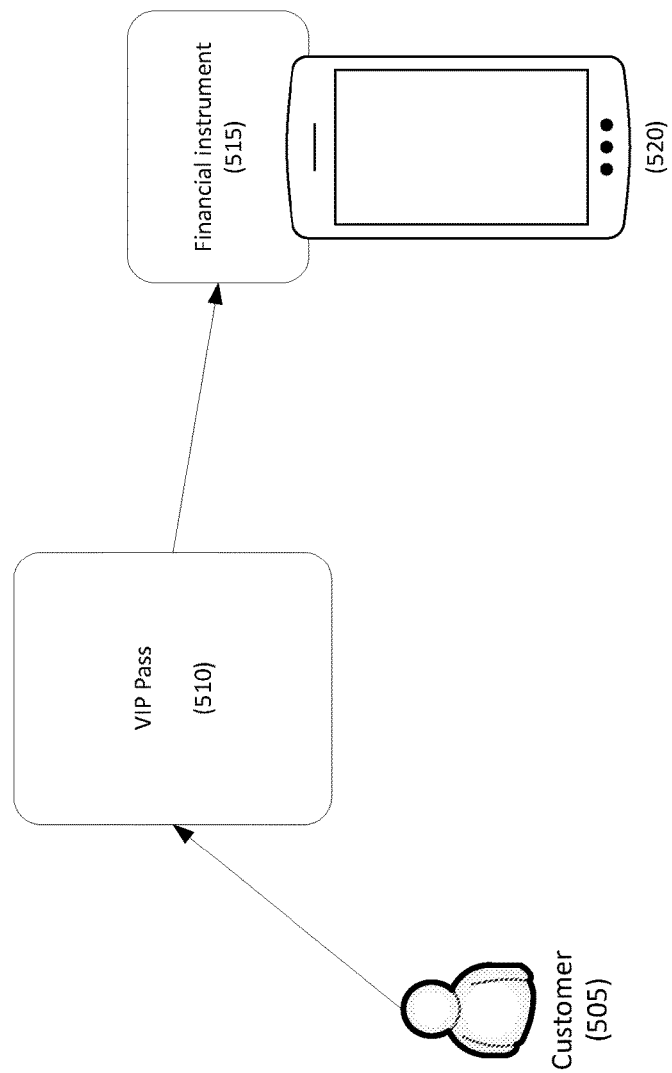
FIG. 5 is an activity flow diagram that illustrates an exemplary sequence of user activities with respect to the user's use of an instrument that facilitates transactions relating to a user experience, according to an exemplary embodiment.

Referring to FIG. 5, an activity flow diagram 500 that illustrates an exemplary sequence of user activities with respect to the user's use of an instrument that facilitates transactions relating to a user experience is shown. As illustrated in FIG. 5, in an exemplary embodiment, a user 505 may express an intention to "go to Disney World," and as a result, the user may be provided with a "Disney World VIP Pass" 510, which may be implemented as either or both of a physical card 515 and a digital token 520 that is accessible via the user's smart phone. The "Disney World VIP Pass" 510 may be preloaded with several offers, including "50% off Airfare", "70% off Hotels", and "45% Restaurants". Additionally, the "Disney World VIP Pass" 510 may also facilitate the execution of transactions by enabling the user to pay via an automatic Pay-with-Points feature, where the user may pay for some or all of the experience using reward or loyalty points that are pre-loaded on the pass. In an exemplary embodiment, the VIP Pass 510 may be used as a single instrument in order to automatically acquire benefits throughout the entire user experience. The expression of the user's intent may be detected in various ways, including being provided directly to the user, or through deduction employing the use of machine learning techniques and the use of omni-channel strategies.

Figure 6:
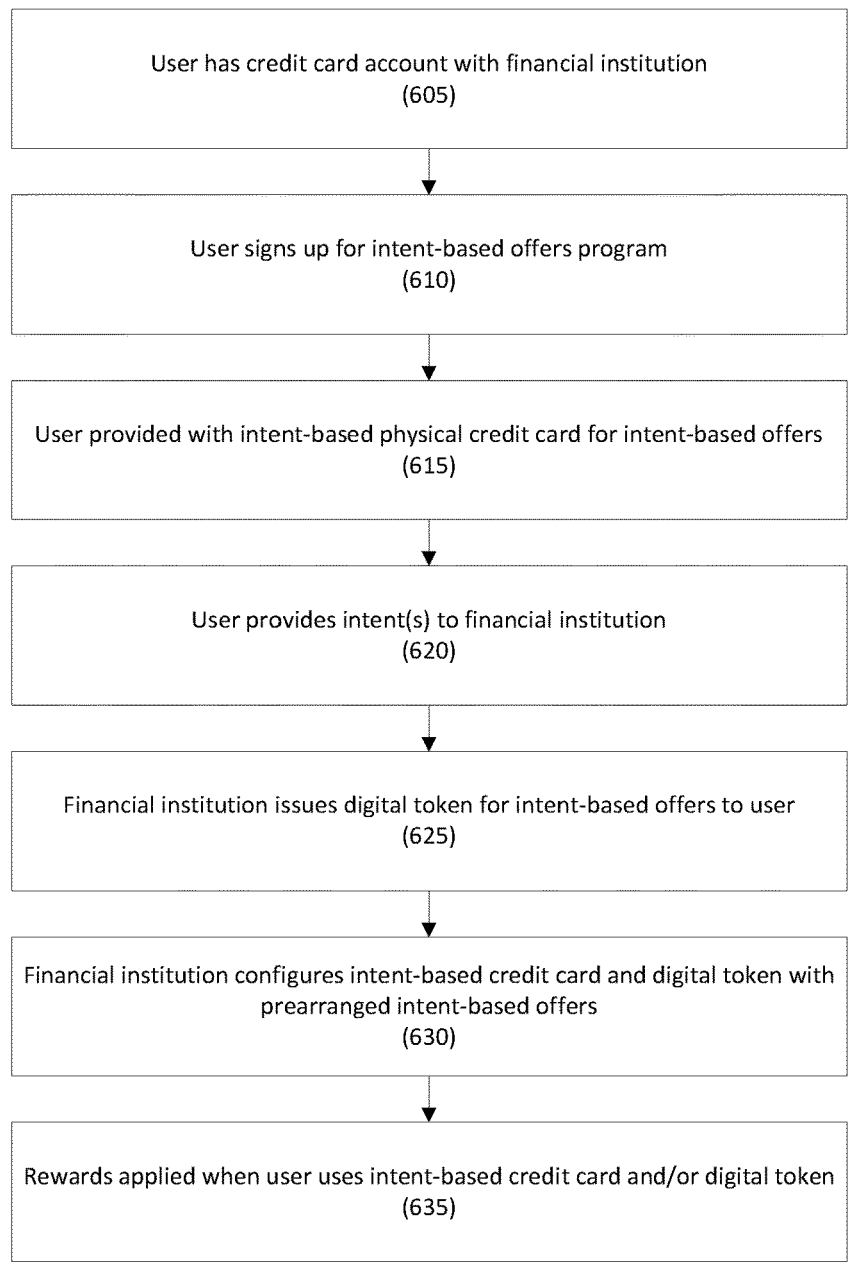
FIG. 6 is an activity flow diagram that illustrates an exemplary sequence of financial institution activities with respect to a user's use of an instrument that facilitates transactions relating to a user experience, according to an exemplary embodiment.

Referring to FIG. 6, an activity flow diagram that illustrates an exemplary sequence of financial institution activities with respect to a user's use of an instrument that facilitates transactions relating to a user experience is shown. As illustrated in FIG. 6, in step 605, a user may have a credit card account with a financial institution, which is accessible by using a conventional credit card.

In step 610, the user may sign up or enroll in an intent-based offer program with the financial institution.

In step 615, the financial institution may issue an intent-based physical credit card for intent-based offers to the user. In one embodiment, this step may be optional, and, based on a user preference, only a digital token may be issued, below.

In step 620, the user may provide one or more intention to have an experience to the financial institution. The intention may be received as disclosed herein, may be deduced from traditional data gathering techniques from others such as searches, social media activities, etc.

In step 625, the financial institution may issue a digital token corresponding to the intent-based physical credit card to the user for use in, for example, a digital wallet.

In step 630, the financial institution may configure the intent-based physical credit card and the digital token with offers and other experience-specific information, such as preloaded points, assigned rewards, and assigned merchants, in order to facilitate potential transactions in which the user may be interested.

In one embodiment, the financial institution may associate the intent-based physical credit card and the digital token with an intent identifier that may be used to convey at least one user intent to merchant(s). In general, the user's intents may be encoded in any type of identifiers which signify intents instead of identity of a person. For example, the intent identifier may be a bank identification number (BIN) or a range of BINs. Each BIN may be associated with an intent category, and may identify an offer or discount that the merchant(s) is to apply to a purchase. For example, BIN 1 may be associated with $5 off any purchase, BIN 2 may give 50% off a car rental, etc.

Other intent identifiers may be used as is necessary and/or desired.

Then, when the user has the experience and uses the configured intent-based physical credit card or the digital token, in step 635, the rewards may be applied on a card/token basis.

Figure 7:
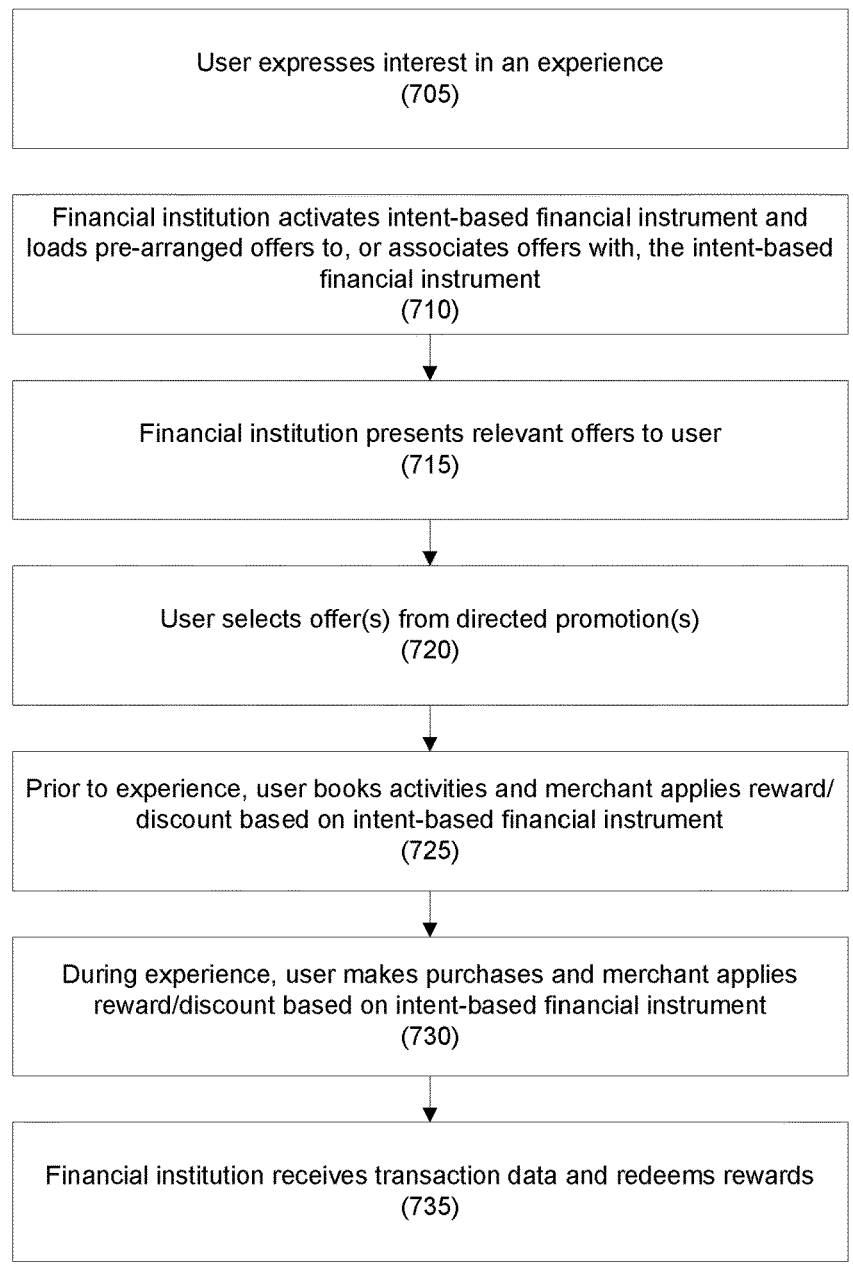
FIG. 7 is an activity flow diagram that illustrates an exemplary sequence of interactions between a user, a financial institution, and a merchant with respect to a user's use of an instrument that facilitates transactions relating to a user experience, according to an exemplary embodiment.

Referring to FIG. 7, an activity flow diagram that illustrates an exemplary sequence of interactions between a user, a financial institution, and a merchant with respect to a user's use of an instrument that facilitates transactions relating to a user experience is shown. In an exemplary embodiment, in step 705, the user may express an interest in having an experience, and, in step 710, the financial institution may provide an intent-based financial instrument (e.g., an intent-based physical credit card and/or a digital token) that is connected to a user account. The intent-based financial instrument may include offers and other experience-specific information that effectively guides the user toward promotions that are prearranged by the financial institution with one or more cooperating merchants. In this manner, the user may save time and money by virtue of the discounted offers and the simplification of the overall process of planning the experience, the merchant benefits when the user accepts one or more offers, and the financial institution benefits by its participation in the transactions.

In step 715, the financial institution may inform the user of the benefits, offers and/or cooperating merchants based on the expressed desire of a particular experience. In step 720 the participating merchant(s) may present relevant offers to the user, by, for example, internet-based ads, application-based ads, emails, television, printed materials, etc.

In step 725, the user may select one or more offer, and in step 730, prior to the experience, may book activities. For example, the user may book the activities over the Internet, by phone, in person, etc. In one embodiment, the user may present the intent-based financial instrument as payment for the activities. The merchant(s) may apply the promotions to the booked offers.

In step 735, during the experience, the user may pay for the activity using the intent-based financial instrument (e.g., in person, over the phone, over the Internet, etc.) or token (e.g., using a payment application, digital wallet, etc.). The merchant(s) may apply the promotions to the purchases accordingly based on the intent identifier either encoded in the financial instrument at time of purchases or separately provided by the financial beforehand.

In step 740, the financial institution may receive the transaction data, and may apply the benefits or rewards based on the expressed experience intent.

Figure 8:
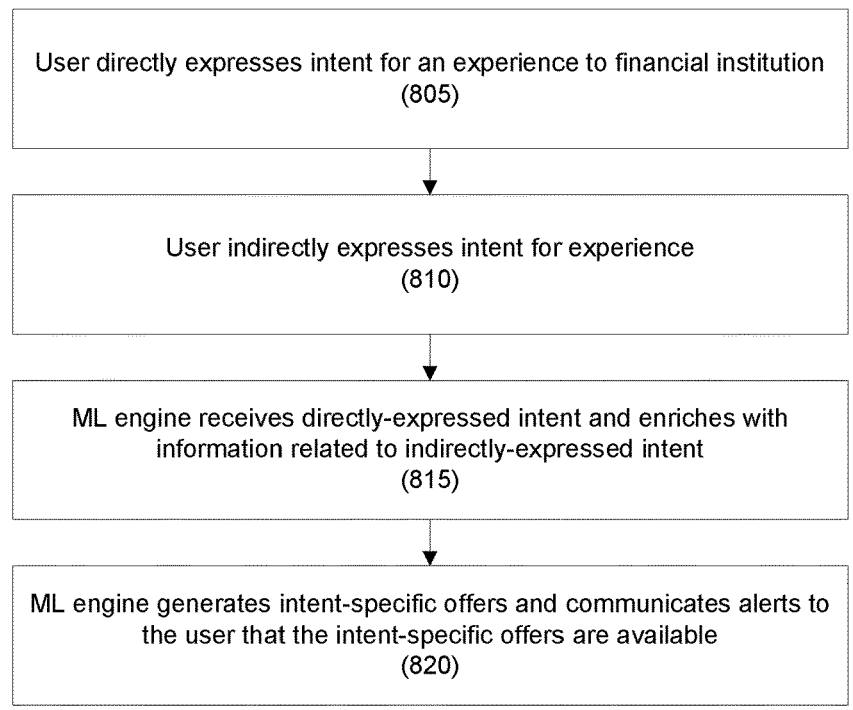
FIG. 8 is a data flow diagram that illustrates an exemplary sequence of data gathering and analysis activities with respect to obtaining information that relates to a user's intention to engage in an experience and information that relates to historical data, demographic statistics, and patterns, according to an exemplary embodiment.

Referring to FIG. 8, a data flow diagram that illustrates an exemplary sequence of data gathering and analysis activities with respect to obtaining information that relates to a user's intention to engage in an experience and information that relates to historical data, demographic statistics, and patterns is shown. According to an exemplary embodiment, in step 805, the user may directly express an intent to engage in an experience to, for example, a financial institution. For example, the user may express the intent in-person, using an application, using a website, etc.

In step 810, the user may also express an intent indirectly to third parties by, for example, making a reservation with a merchant (e.g., booking a trip, renting a car, or buying a ticket), performing Internet searches for experience-related items, such as places, trips, or concerts, using social media to post messages about experience-related items, such as places or events, etc.

In step 815, a machine learning engine (e.g., an experience intents ML engine) may receive both the directly-expressed intent and the indirectly-expressed intent and may enrich or use in lieu of the directly-expressed intent. The experience intents ML engine may also receive inputs that relate to user interactions with the financial institution, such as payment card analytics, user profile data, transaction history data, general demographic data, merchant data, etc. to determine potential experiences in which the user may be interested.

In one embodiment, the intents ML engine may also receive information regarding goods or services offered by merchants, etc.

For example, if a customer directly expresses an intention to take a family vacation, and conducts searches on ski equipment, the experience intents ML engine may enrich the direct intent with information regarding hotels located near ski resorts, air fare, ski equipment rentals, and what products or services similar customers desire to purchase on similar experiences, etc.

In step 820, based on the enriched direct intent, the ML engine may generate intent-specific offers that have been prearranged with merchants, and may transmit alerts to the user that such offers are available, thereby guiding the user to conduct experience-related transactions. For example, the alerts may be provided by email, in-app notifications, or any other suitable means.

Figure 9:
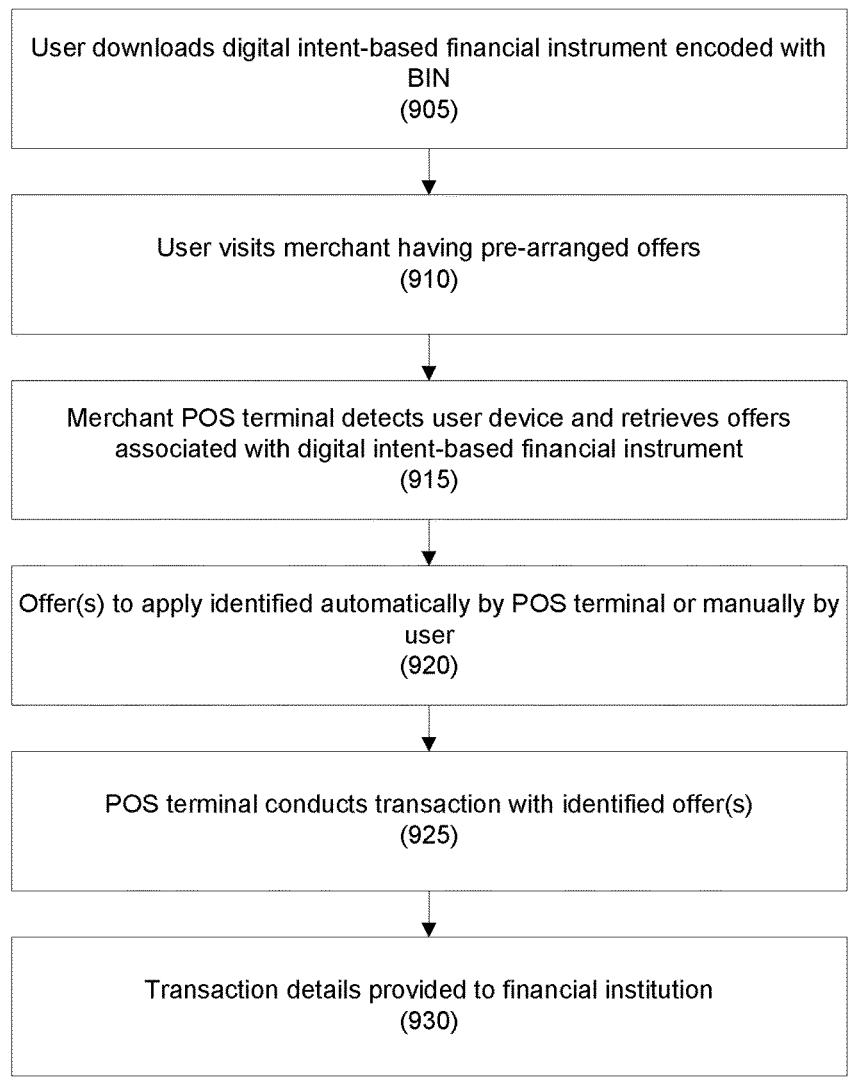
FIG. 9 is a data flow diagram that illustrates an exemplary sequence of interactions between a user, a merchant, and a financial institution with respect to the user's use of an instrument that facilitates transactions at a point-of-sale terminal, according to an exemplary embodiment.

Referring to FIG. 9, a data flow diagram that illustrates an exemplary sequence of interactions between a user, a merchant, and a financial institution with respect to the user's use of an instrument that facilitates transactions at a point-of-sale terminal is shown. In step 905, a user may download a digital intent-based financial instrument that is encoded with a BIN and configured for facilitating experience-related transactions onto a smart phone.

In step 910, the user may then visit a place of business of a merchant that has provided a prearranged offer to the user.

When the user is ready to execute a transaction, in step 915, the merchant's point-of-sale (POS) terminal may detect Bluetooth low energy (BLE) information from the user's smart phone and may retrieve related offers that is on the digital intent-based financial instrument. In another embodiment, the POS terminal may be configured to establish connectivity with a user's smart phone by using any one of BLE, wireless fidelity (WiFi), near-field communication (NFC), Quick Response (QR) code, and/or any other connectivity method that is known to persons having skill in the art.

In step 920, the POS terminal or backend may determine which offers are applicable to the transaction and may display these offers on a screen of the POS terminal.

In step 925, the POS terminal or backend may conduct the transaction by automatically applying the terms of the offers. In another embodiment, the user may manually select the offers to apply.

In step 930, the POS terminal may then provide the transaction details to the financial institution in order to receive its payment from the user's account.

In embodiments, a consumer's intent may be used to present intent-specific ads and/or offers to the consumer. The consumer may want to maintain his or her privacy; thus, embodiments may facilitate consumer's data to flow from the consumer's device to a network to an intent broker where the consumer's intent may be associated with an intent identifier. Any private data for the consumer may be anonymized. Instead of receiving the consumer's private data, the advertisers may receive the intent identifier(s) and may provide intent-based ads to the consumer using that intent identifier. Thus, the consumer's privacy is not compromised. The supply side (e.g., ad space side) and the demand side (e.g., advertisers) may work in a digital ad marketplace.

Figure 10:
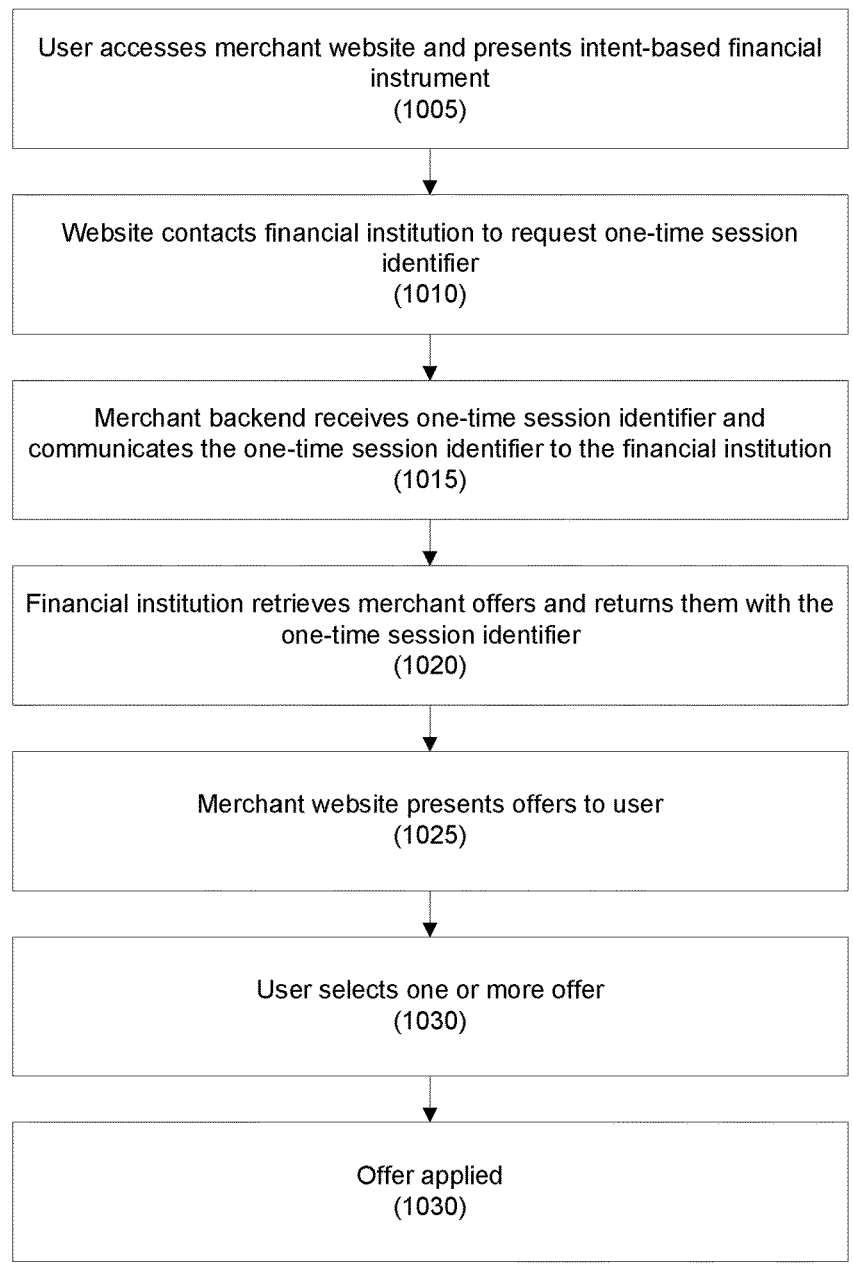
FIG. 10 is a data flow diagram that illustrates an exemplary sequence of interactions between a user, a merchant, and a financial institution with respect to the user's use of an instrument that facilitates transactions at the merchant's web site, according to an exemplary embodiment.

Referring to FIG. 10, a data flow diagram that illustrates an exemplary sequence of interactions between a user, a merchant, and a financial institution with respect to the user's use of an instrument that facilitates transactions at the merchant's web site is shown. In step 1005, a user may access a website of a merchant and may provide an intent-based financial instrument to the merchant. The intent-based financial instrument may include pre-arranged offers and discounts arranged by the financial institution with the merchant.

In step 1010, the merchant website may access the financial institution to retrieve a one-time session identifier. In one embodiment, the merchant website may include an embedded script that may retrieve the session identifier.

For example, the script may return an identifier that may be used to retrieve the information from the financial institution. The script may execute code for the financial institution so that the financial institution can identify the customer (e.g., access cookies, etc.) and may associate the one-time session identifier with the customer.

In one embodiment, the merchant website may use information that may be stored a cookie, such as a cookie, to access identify the user's financial institution.

In step 1015, a merchant backend, may communicate the one-time session identifier to the financial institution to retrieve the offers for the customer.

In step 1020, the financial institution may retrieve the prearranged offers with the merchant and may send to the prearranged offers with the one-time session identifier to the merchant website or backend.

In step 1025, the merchant website may present the prearranged offers to the user, and in step 1030, the user may select one or more of the prearranged offers.

In step 1035, the prearranged offer may be applied.

Accordingly, with this technology, an optimized process for implementing an instrument that facilitates transactions based on a user's intent with respect to a proposed event or experience is provided. The optimized process facilitates transactions by utilizing information that indicates the user's intent to determine potential transactions that would enhance the user's experience while also benefiting merchants and the financial institution that are parties to the transactions.

Figure 11:
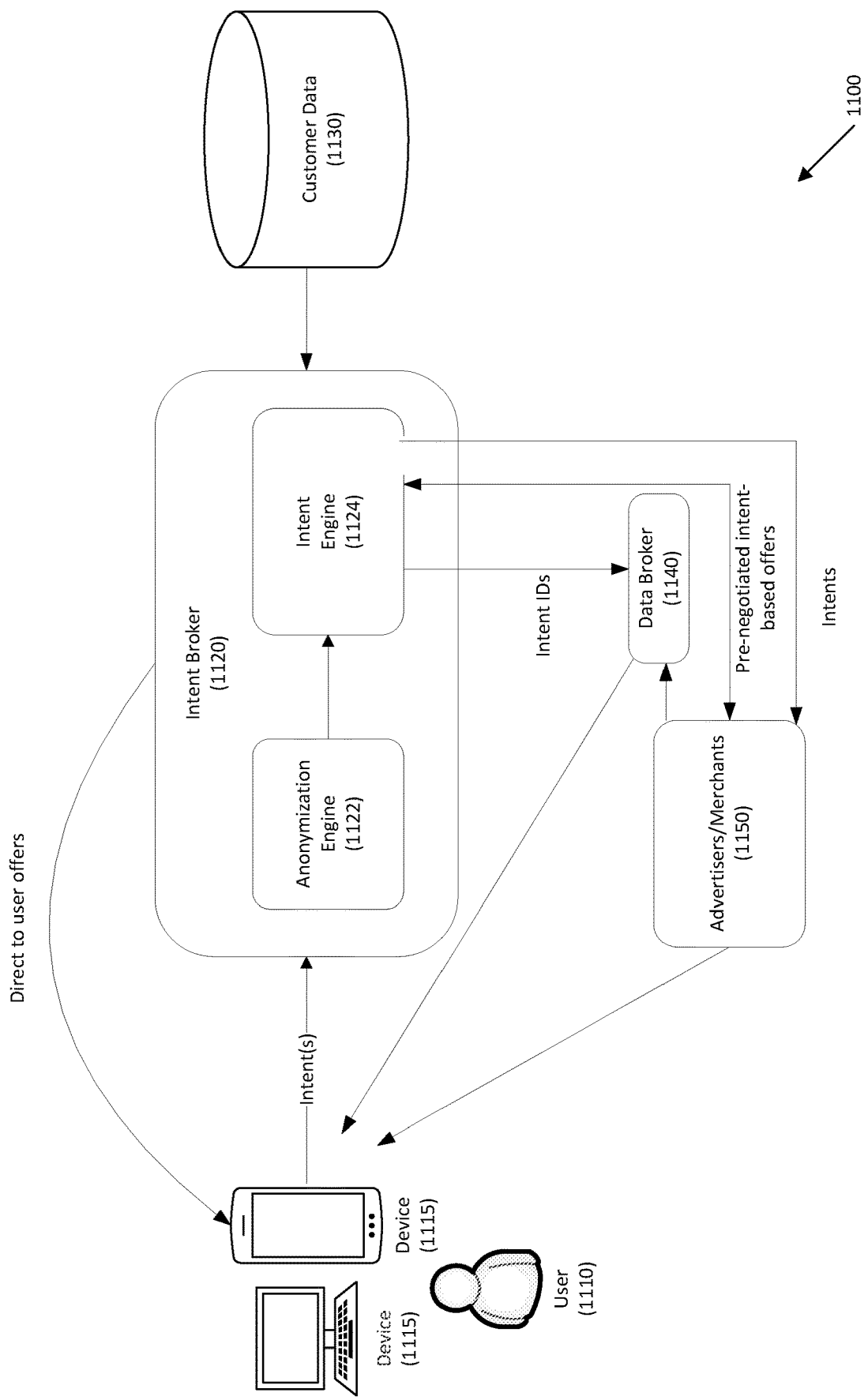
FIG. 11 depicts a system for intent-based advertising and offers according to one embodiment.

Referring to FIG. 11, a system for intent-based advertising and offers is provided according to one embodiment. System 1100 may include user 1110 that may use electronic device 1115. Electronic device 1115 may be any suitable electronic device, including mobile device (e.g., smart phones), computers (e.g., workstations, desktops, tablets, etc.), kiosks, terminals, televisions, monitors, smart speakers, etc.

In one embodiment, user 1110 may be associated with electronic device 1115. For example, intent broker 1120 may maintain a relationship between user 1110 and electronic device 1115.

System 1100 may further include intent broker 1120, which may be an entity that is trusted by the user. Any entity that may facilitate user interaction through which the user's intents can be trusted with maybe used as is necessary and/or desired. An example of an intent broker is a financial institution. Because financial institutions normally do not have relationships with advertisers for the purposes of selling ads to them, data broker 1140 may facilitate these relationships.

Intent broker 1120 may receive intents from user 1110 and/or device 1115. For example, user 1110 may identify intents, such things that user 1110 wants, things that user 1110 wants to do, etc. in any suitable manner. Intents may be received as discussed in other embodiments, above, such as through an application, website, in-person, etc.

Intent broker 1120 may include anonymization engine 1122 that may anonymize data for user 1110 and/or device 1115. For example, anonymization engine 1122 may anonymize the user's intents by publishing an intent identifier or similar instead of publishing the user's private or personal data. For example, because user 1110's intents are known, there may be little value in fingerprint data from device 1115. Thus, advertisers/merchants 1150 may not request this data.

Intent engine 1124 may associate user 1110's intents with an intent identifier. For example, intent engine may maintain a table of possible intents that may range from very general (e.g., user 1110 intends to take a vacation) to very specific (e.g., user 1110 wants to take a 4-day vacation to Disney World in March). The intent identifier may include any suitable identifier as is necessary and/or desired.

In one embodiment, the intent identifier may be provided by anonymization engine 1122.

In one embodiment, intent engine 1124 may enrich user 1110's intent with customer data from customer data database 1130. Examples may include payment card analytics, user profile data, transaction history data, general demographic data, merchant data, purchase patterns, etc. to determine potential experiences in which the user may be interested.

In one embodiment, the customer data may be used to further deduce user 1110's intent, to better assess user 1110's intent, etc. The customer data may also be used to identify the products and/or services that best suit user 1110's intent.

In one embodiment, intent engine 1124 may be an experience intents machine learning engine as discussed above.

In one embodiment, intent engine 1124 may receive pre-negotiated intent-based offers from advertisers and/or merchants 1150, which may be entities that participate in the intent-based program with intent broker 1120. In one embodiment, intents engine 1124 may identify pre-negotiated intent-based offers that it may directly offer to user 1110 via, for example, device 1115. For example, pre-negotiated intent-based offers may be presented using a mobile application, browser, push messaging, etc.

In one embodiment, intent broker 1120 may refine or renegotiate the pre-negotiated intent-based offers with advertisers/merchants 1150 based on user 1110's intent(s), the intents of other users that may participate with intent broker 1120, etc. For example, if a large number of users have the same intent, intent broker 1120 may receiver better discounts and/or offers from advertisers/merchants 1150.

Data broker 1140 may receive the intent identifier from intent engine 1124, and may also receive ads, offers, discounts, from advertisers/merchants 1150. In one embodiment, advertisers/merchants 1150 may categories the ads, offers, discounts, etc. based on intent. In one embodiment, advertisers/merchants 1150 may bid on ad space provided by a publisher (not shown), such as a website, an application, etc. In one embodiment, the publisher may identify ad space that is available to data broker 1140, and data broker 1140 may match that ad space with ads, offers, or discounts from advertisers/merchants 1150. Data broker 1140 may then provide the intent-specific ads to user 1110 using device 1115 by the publisher's mobile application, website, television, etc.

Advertisers/merchants 1150 may provide intent-specific ads and/or intent-based discounts directly to user 1110 using device 1115 by their mobile application or website. For example, advertisers/merchants 1150 may present advertisements on their web sites or on any touch point where advertisers/merchants 1150 may reach user 1110 directly, such as in a store, checkout line, etc.

Figure 12:
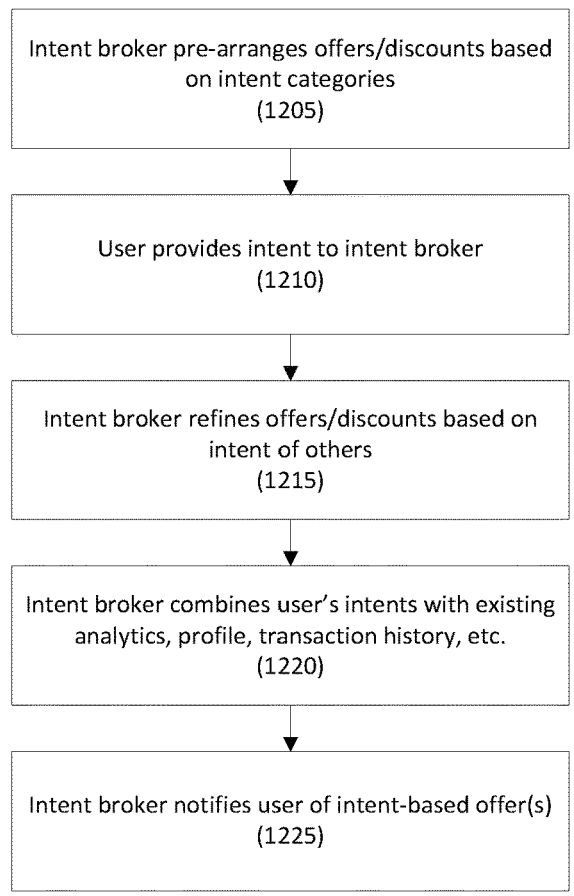
FIG. 12 depicts a method for providing direct to user intent-based offers according to one embodiment.

Referring to FIG. 12, a method for providing direct to user intent-based offers is provided according to one embodiment.

In step 1205, an intent broker may pre-arrange offers/discounts with third parties (e.g., merchants) based on, for example, intent categories.

In step 1210, the user may provide one or more intent to the intent broker. In one embodiment, the user may express the intent directly using an application, a website, in person, etc. In one embodiment, the intent may be general or it may be specific.

In step 1215, based on the user's intent and the intents of other participating users, the intent broker may refine the pre-negotiated offers/discounts with the merchants. For example, if a large number of users have the same intent, the intent broker may provide better discounts or offers for the users.

In step 1220, the intent broker may combine the user's intent with existing analytic, user profile, user transaction history, etc. to identify pre-arranged offers and/or discounts to directly offer to the user. For example, offers may be made based on user data, such as personal history, data for other users with similar financial situation, demographics, purchase patterns, etc. to identify products and/or services that are suitable for similar intents may be used to identify offers. Further, data from merchants on their products or services for intents may be used to identify offers.

In step 1225, once identified, the direct offers may be made via an application, a website, a push notification, email, in-person communication, regular mail, etc. Any suitable method for communicating the direct offer(s) may be used as is necessary and/or desired.

Figure 13:
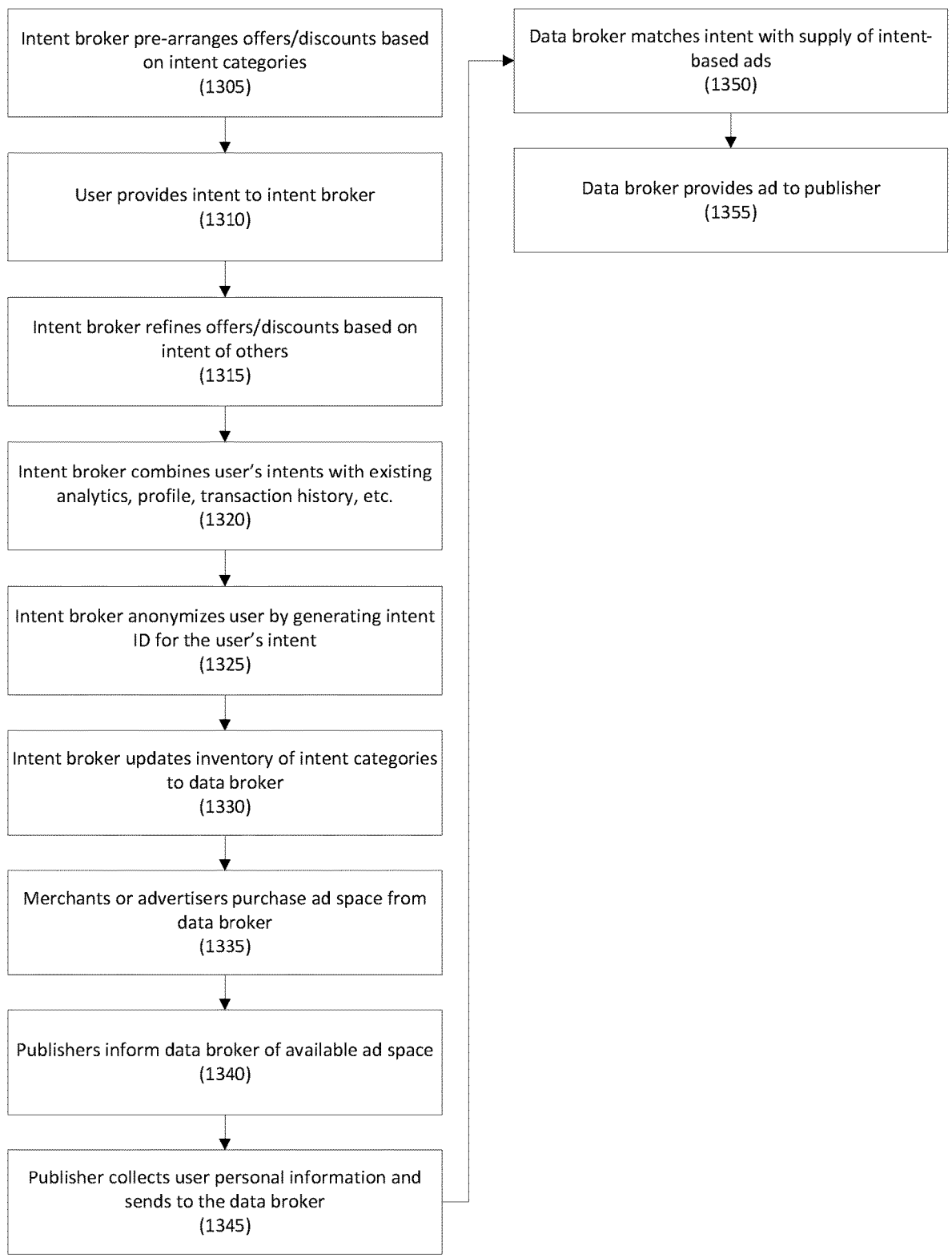
FIG. 13 depicts a method for providing brokered intent-based offers according to one embodiment.

Referring to FIG. 13, a method for providing brokered intent-based offers is provided according to one embodiment.

In step 1305, an intent broker may pre-arrange offers/discounts with third parties (e.g., merchants) based on, for example, intent categories. This may be similar to step 1205, above. It should be noted that this may be optional.

In step 1310, the user may provide one or more intent to the intent broker. This may be similar to step 1210, above.

In step 1315, based on the user's intent and the intents of other participating users, the intent broker may refine the pre-negotiated offers/discounts with the merchants. This may be similar to step 1215, above. It should be noted that this may be optional.

In step 1320, the intent broker may combine the user's intent with existing analytic, user profile, user transaction history, etc. to identify pre-arranged offers and/or discounts to directly offer to the user. This may be similar to step 1220, above. It should be noted that this may be optional.

In step 1325, the intent broker may anonymize the user's personal information by generating an intent identifier for the intent. The intent identifier may be any suitable identifier that may convey to the user's intent. A set of intent identifiers may be grouped into a broader intent category of generally similar intents. For example, an intent identifier for an interest to vacation for family of four at Disney World in March may be grouped into an intent category of Disney World vacation.

In step 1330, the intent broker may continuously update the inventory of available intent categories to a data broker. The data broker may serve as a broker between a demand side (e.g., advertisers, merchants, etc.), and a supply side (e.g., publishers such as applications, websites, television, etc.). The knowledge of intent inventory may be used by the data broker to pre-assess on coming user interests matching the ad bids or purchases on the demand-side.

In step 1335, merchants/advertisers may purchase ad space from the data broker. For example, the merchants/advertisers may pre-negotiate offers/discounts for certain intent categories or identifiers. The merchants/advertisers may also bid on advertisement spots. Any suitable manner of purchasing ad space may be used as is necessary and/or desired.

In step 1340, publishers (e.g., websites, applications, etc.) may provide the data broker with an inventory of available ad space.

In step 1345, when a user interacts with a publisher, the publisher may collect user's personal information and may send the personal information to the data broker to see if there is any matching demand from merchants who want to advertise for the available spots.

In step 1350, the data broker may send the user's personal information, such as email address, phone number, etc. to the intent broker to retrieve user's intent(s). The data broke may then match the intent(s) with the supply of advertisers' bids or bought spots.

In step 1355, the data broker may send the appropriate data matching the intent back to publisher.

Figure 14:
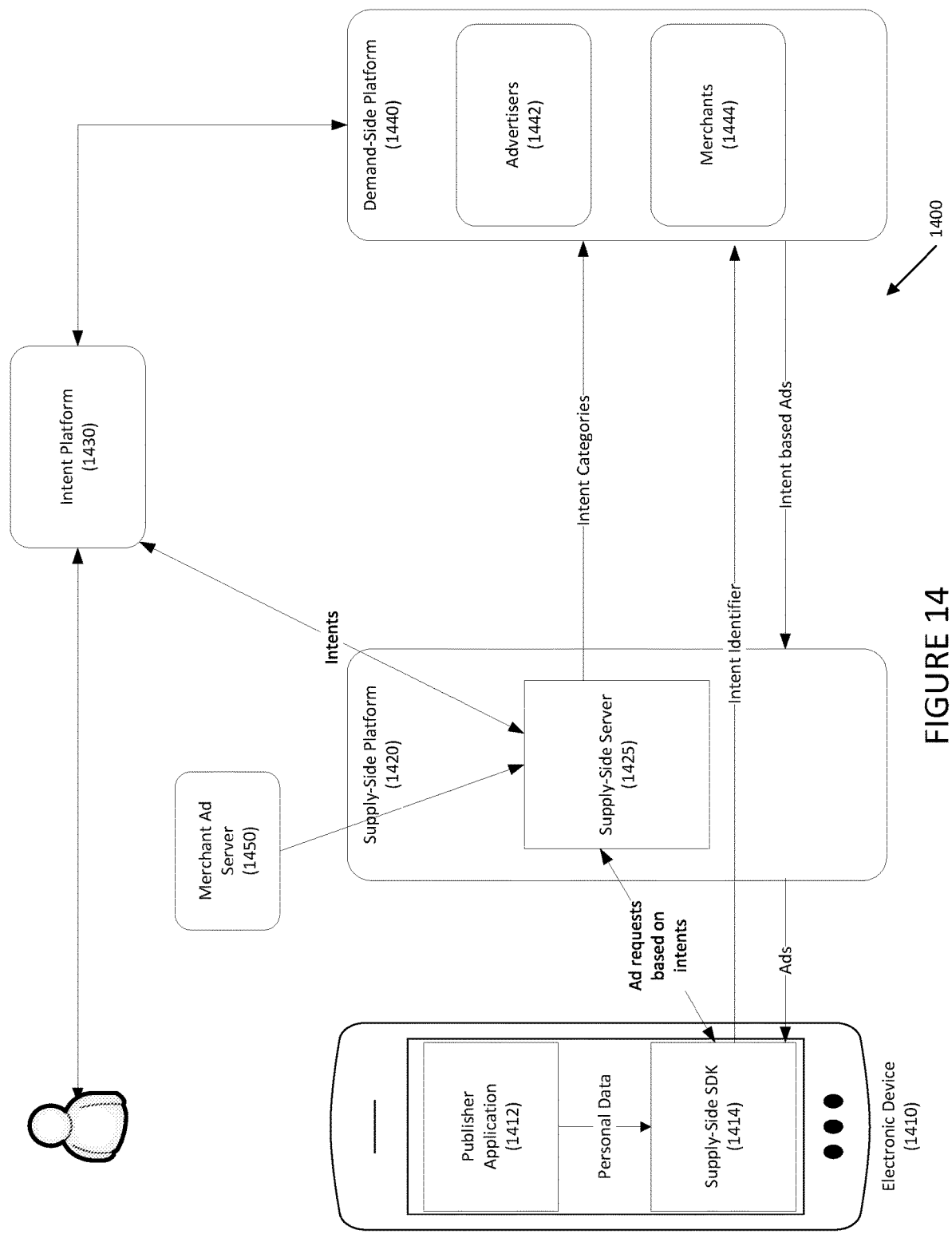
FIG. 14 depicts a system for intent-based offers according to one embodiment.

Referring to FIG. 14, a system for intent-based offers is provided according to one embodiment is disclosed according to one embodiment. System 1400 may include electronic device 1410, which may be any suitable electronic device that may execute programs and applications, such as publisher application 1412 and software development kit (SDK) 1414. Examples of electronic devices 1410 include smart phones, computers (e.g., workstation, desktop, laptop, tablet, etc.), Internet of Things (IoT) devices, etc.

In one embodiment, publisher application 1412 may embed SDK 1414 provided by supply side platform 1420 and demand side platform 1440. SDK 1414 may facilitate communication between publisher application 1412, supply side platform 1420 and demand side platform 1440.

Publisher application 1412 may be any application that may provide advertising space.

SDK 1414 may interface with publisher application 1412 to retrieve personal data from third-party application 1412. For example, SDK 1414 may receive user data, browsing data, transaction data, etc. from publisher application 1412. The nature of the personal data may depend on the nature of publisher application 1412.

System 1400 may further include supply side platform 1420, which may include supply side platform server 1425. Supply side platform server 1425 may receive personal data from SDK 1414 and may use the personal data to identify the user. Supply side platform server 1425 may interface with intent platform 1430, which may be provided by an intent broker (not shown). Supply side platform server 1425 may provide intent platform with an identifier for the user, and intent platform 1430 may provide an intent identifier for the user.

Supply side platform server 1425 may further interface with demand-side platform, which may include one or more advertiser 1442 and merchant 1444. Advertisers 1442 and/or merchant 1444 may pre-arrange offers, discounts and advertisements with intent platform 1430.

Supply side platform server 1425 may communicate the user's intent (e.g., intent categories, intent identifier, etc.) to demand side platform 1440, and advertisers 1442 and/or merchants 1444 may return intent-based ads and/or offers to supply side platform server 1425. Supply side platform server 1425 may then return the intent-based ads and/or offers to SDK 1414, and the intent-based ads and/or offers may be presented on electronic device 1410 as in-app ads or offers, etc.

Merchant ad server 1420 may provide ad content to supply side server 1425 or directly to SDK 1414.

By using the intent identifier instead of personal data, supply side platform server 1425 effectively anonymizes the user from demand-side platform 1440.

Figure 15:
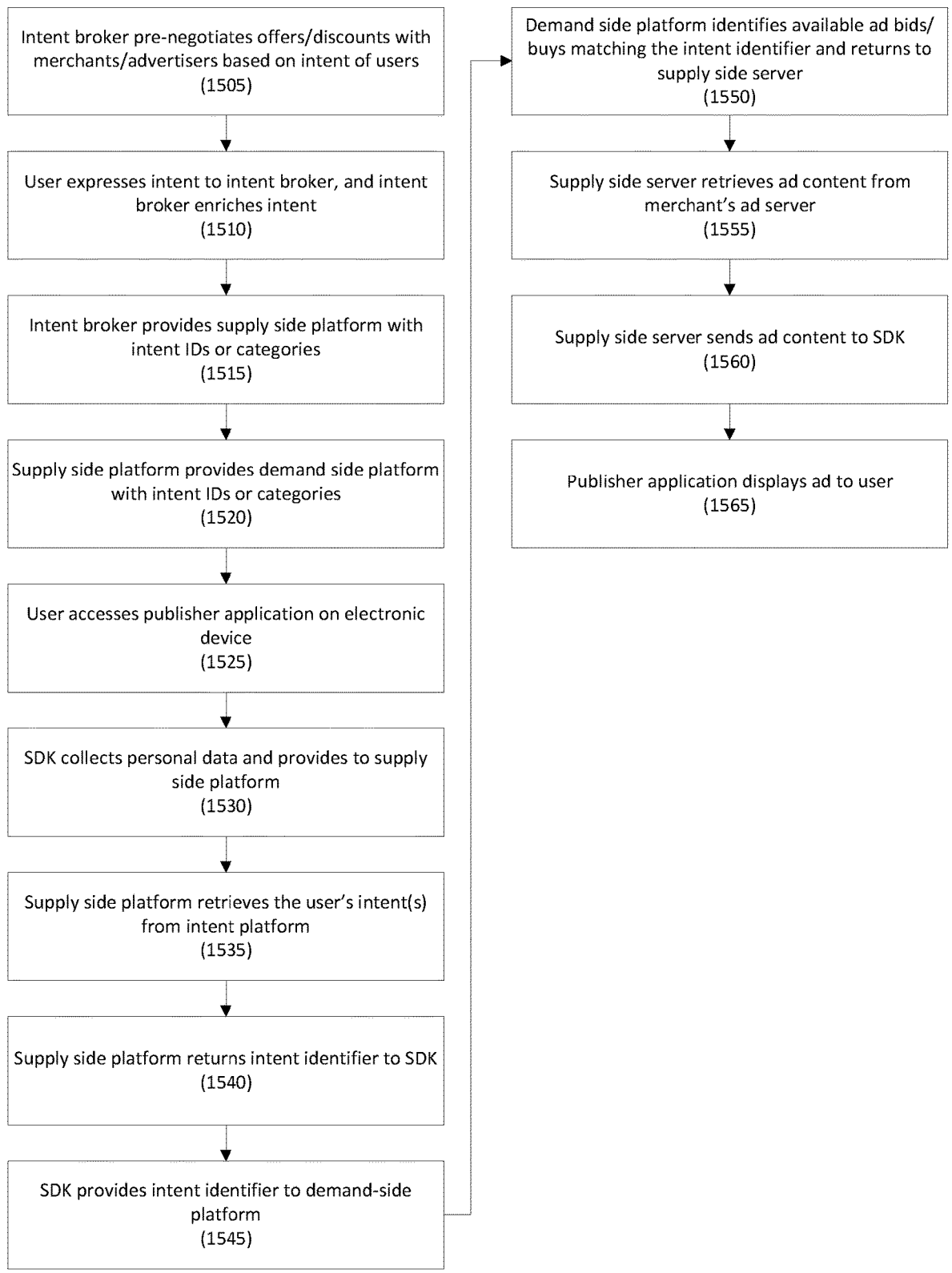
FIG. 15 depicts a method for intent-based offers according to one embodiment.

Referring to FIG. 15, a method for intent-based offers is provided according to one embodiment is disclosed according to one embodiment.

In step 1505, an intent broker may pre-negotiate offers/discounts with merchants/advertisers based on the intent of its participating users.

In step 1510, a user may express an intent to the intent broker, and the broker may enrich the user's intent. This may be done as discussed above.

In step 1515, the intent broker may provide the supply side platform with intent identifiers or categories for a plurality of intents.

In step 1520, the supply side platform may provide the demand side platform with the intent identifiers or categories.

In step 1525, the user may access a publisher computer application executed on an electronic device. The computer application may be embedded with a SDK.

In step 1530, the SDK may capture personal data from one or more publisher applications also executed by the electronic device. Examples of personal data that may be captured include browsing data, transaction data, user identification, etc.

In step 1535, the SDK may provide the personal data to a supply side server on a supply side platform, and in step 1540, the supply side server may use the personal data to identify the user and to retrieve one or more intent for the user from the intent broker.

In one embodiment, the intent may be provided as an intent identifier, an intent category, etc.

In step 1545, the SDK may provide one or more intents, intent indicators, intent categories, etc. to the demand-side platform. The merchants and/or advertisers may seek to offer intent-based ads, offers, and/or discounts to the user via the publisher application.

In step 1550, the demand-side platform may identify available ad bids or buys that match the intent identifier, and may return this to the supply side server.

In step 1555, the supply side may retrieve ad content, or a pointer to the ad content, from the merchant's ad server, and in step 1560, may send the ad content or the pointer to the SDK. In step 1565, the publisher application may present the ads to the user as in-app ads, etc.

Figure 16:
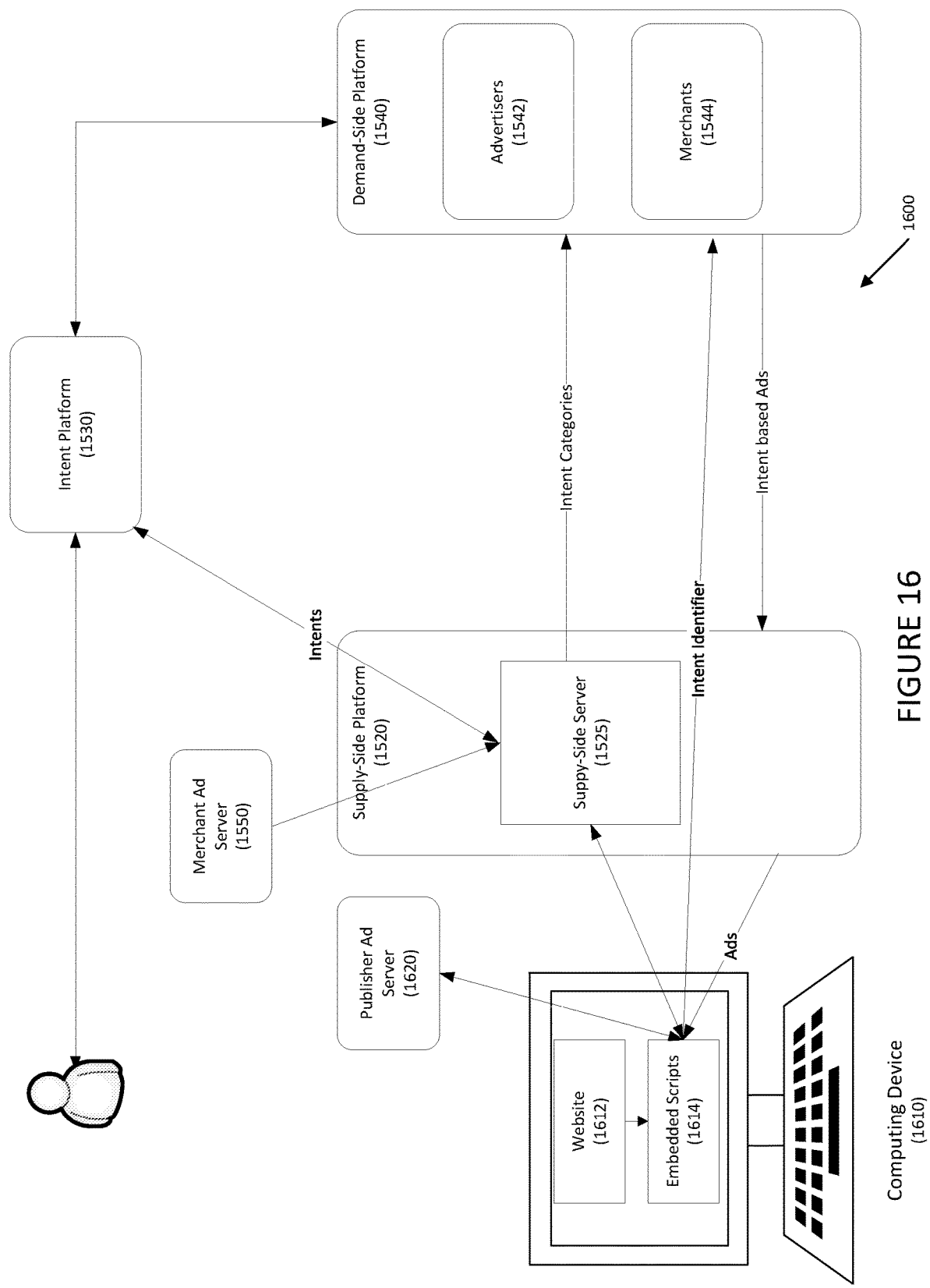
FIG. 16 depicts a system for intent-based offers according to one embodiment.

Referring to FIG. 16, a system for intent-based offers is provided according to one embodiment is disclosed according to one embodiment. System 1600 includes many elements that were described with reference to system 1500; a description of these overlapping elements is omitted.

System 1600 may include computing device 1610, which may be any suitable computing device that supports a browser application or program. Examples include workstations, desktop computers, notebook computers, tablet computers, smart phones, smart watches, etc.

Computing device 1610 may execute browser accessing website 1612, and website 1612 may include embedded scripts that may capture the user's personal identification information.

Scripts 1614 may provide the personal information to supply side server, and may also retrieve ad slot availability from publisher ad server 1620. Scripts may further receive "won" ads for display from the demand side, and may retrieve ad content from the merchant ad server.

Figure 17:
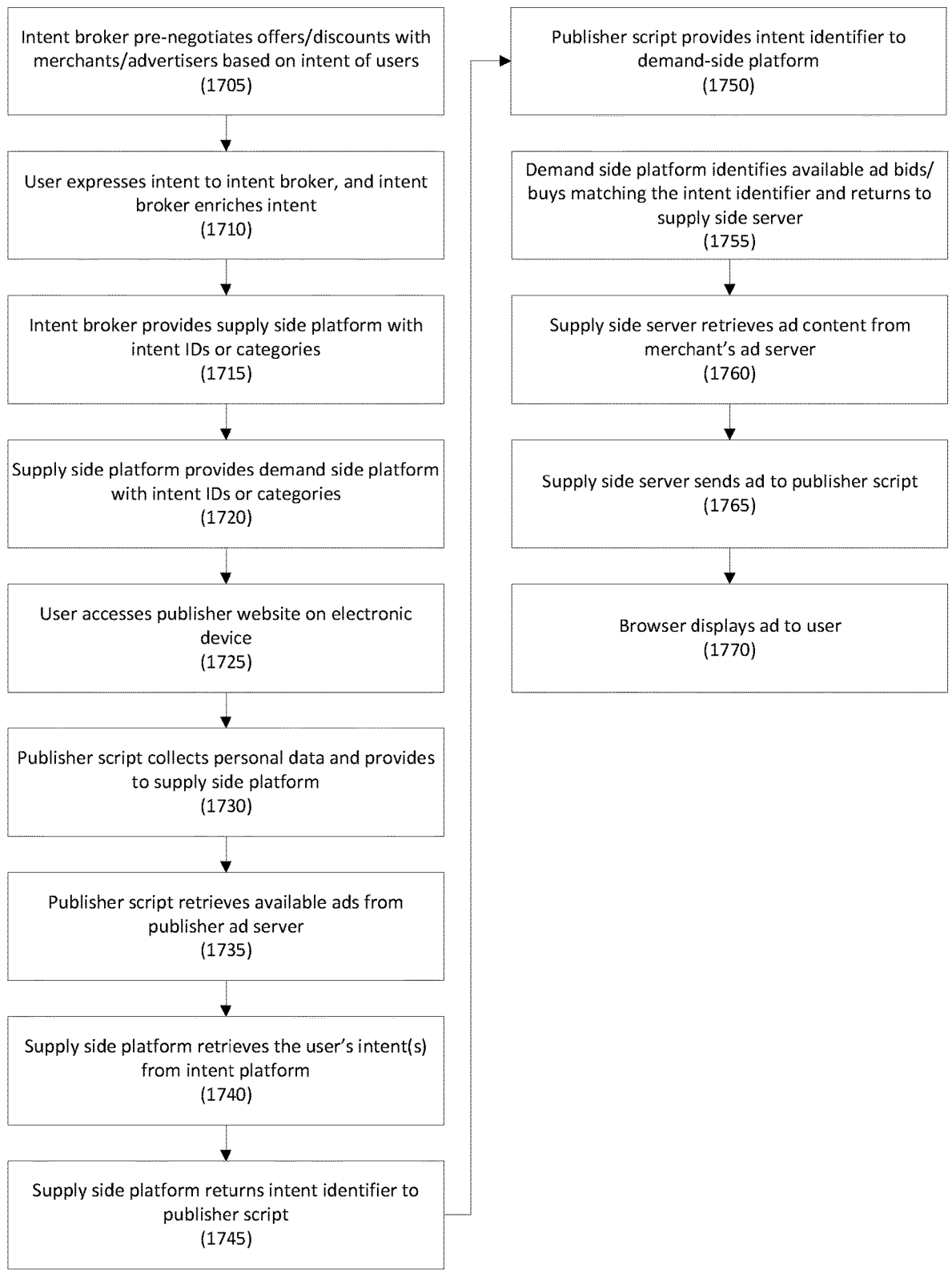
FIG. 17 depicts a method for intent-based offers according to one embodiment.

Referring to FIG. 17, a method for intent-based offers is provided according to one embodiment is disclosed according to one embodiment.

In step 1705, an intent broker may pre-negotiate offers/discounts with merchants/advertisers based on the intent of its participating users.

In step 1710, a user may express an intent to the intent broker, and the broker may enrich the user's intent. This may be done as discussed above.

In step 1715, the intent broker may provide the supply side platform with intent identifiers or categories for a plurality of intents.

In step 1720, the supply side platform may provide the demand side platform with the intent identifiers or categories.

In step 1725, the user may access a website executed by a computing device. The website may include embedded scripts.

In step 1730, the scripts may capture personal data from the browser. Examples of personal data that may be captured include browsing data, transaction data, user identification, etc.

In step 1735, scripts may retrieve available ads from a publisher ad server.

In step 1740, the script may provide the personal data to a supply side server on a supply side platform, and in step 1745, the supply side server may use the personal data to identify the user and to retrieve one or more intent for the user from the intent broker.

In one embodiment, the intent may be provided as an intent identifier, an intent category, etc.

In step 1750, the script may provide one or more intents, intent indicators, intent categories, etc. to the demand-side platform. The merchants and/or advertisers may seek to offer intent-based ads, offers, and/or discounts to the user via the publisher application.

In step 1755, the demand-side platform may identify available ad bids or buys that match the intent identifier, and may return this to the supply side server.

In step 1760, the supply side may retrieve a pointer to the ad content from the merchant's ad server, and in step 1765, may send a redirect pointer to the merchant's ad server to the script. In step 1770, the browser may download the ad content from the merchant server and may present the ad to the user.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for communicating an anonymized user intent, comprising:
   in a networked computer platform including an intent broker and a supply-side information processing apparatus comprising at least one computer processor:
   receiving, at the supply-side information processing apparatus and from a third-party application executing on an electronic device, personal data of a user of the electronic device;
   identifying, by the supply-side information processing apparatus and based on the personal data of the user of the electronic device, a user identifier, wherein the user identifier is associated with the user of the electronic device;
   receiving, by the intent broker, user intention information;
   storing, by the intent broker, the user intention information in a table of a user-specific database, wherein the user intention information is associated with the user identifier and an intent identifier, and wherein the intent identifier represents a user-intention category;
   sending, by the supply-side information processing apparatus, the user identifier to the intent broker;
   receiving, by the supply-side information processing apparatus and from the intent broker, the intent identifier;

communicating by the supply-side information processing apparatus, the user-intention category to a demand-side platform, the demand-side platform comprising a merchant;

receiving, by the supply-side information processing apparatus and from the demand-side platform, a digital intent-based transaction instrument that is associated with the user-intention category;

sending by the supply-side information processing apparatus, the digital intent-based transaction instrument that is associated with the user-intention category to the electronic device;

retrieving, by a point-of-sale device of the merchant, offer information from the digital intent-based transaction instrument using a near field communication connection with the electronic device; and applying, by the point-of-sale device, offer terms indicated in the offer information from the digital intent-based transaction instrument to a transaction.

2. The method of claim 1, wherein the personal data comprises at least one of user data and application usage data.

3. The method of claim 1, wherein the communicating the user-intention category to the demand-side platform includes communicating the intent identifier to the demand-side platform.

4. The method of claim 1, wherein the communicating the user-intention category to the demand-side platform consists of communicating the intent identifier to the demand-side platform.

5. The method of claim 1, wherein a software development kit is embedded in the third-party application.

6. The method of claim 5, wherein the software development kit interfaces with the third-party application to retrieve the personal data of the user of the electronic device.

7. The method of claim 1, wherein the user-intention category is based on an express intent provided by the user of the electronic device to the intent broker.

8. The method of claim 7, wherein the user-intention category is enhanced with one of payment card analytics, user profile data, transaction history data, general demographic data, and data from merchants.

9. The method of claim 1, wherein the user-intention category is based on one of the following that is received from the electronic device by the intent broker:
payment card analytics,
user profile data,
transaction history data,
general demographic data, and
data from merchants.

10. A system comprising at least one computer including a processor and a memory, wherein the at least one computer includes an intent broker, a supply-side information processing apparatus, and a point-of-sale device, and wherein the at least one computer is configured to:

receive, at the supply-side information processing apparatus and from a third-party application executing on an electronic device, personal data of a user of the electronic device;

identify, by the supply-side information processing apparatus and based on the personal data of the user of the electronic device, a user identifier, wherein the user identifier is associated with the user of the electronic device;

receive, by the intent broker, user intention information;

store, by the intent broker, the user intention information in a table of a user-specific database, wherein the user intention information is associated with the user identifier and an intent identifier, and wherein the intent identifier represents a user-intention category;

send, by the supply-side information processing apparatus, the user identifier to the intent broker;

receive, by the supply-side information processing apparatus and from the intent broker, the intent identifier;

communicate by the supply-side information processing apparatus, the user-intention category to a demand-side platform, the demand-side platform comprising a merchant;

receive, by the supply-side information processing apparatus and from the demand-side platform, a digital intent-based transaction instrument that is associated with the user-intention category;

send, by the supply-side information processing apparatus, the digital intent-based transaction instrument that is associated with the user-intention category to the electronic device;

retrieve, by a point-of-sale device of the merchant, offer information from the digital intent-based transaction instrument using a near field communication connection with the electronic device; and apply, by the point-of-sale device, offer terms indicated in the offer information from the digital intent-based transaction instrument to a transaction.

11. The system of claim 10, wherein communicating the user-intention category to the demand-side platform includes communicating the intent identifier to the demand-side platform.

12. The system of claim 10, wherein communicating the user-intention category to the demand-side platform consists of communicating the intent identifier to the demand-side platform.

13. The system of claim 10, wherein a software development kit is embedded in the third-party application.

14. The system of claim 13, wherein the software development kit interfaces with the third-party application to retrieve the personal data of the user of the electronic device.

15. The system of claim 10, wherein the user-intention category is based on an express intent provided by the user of the electronic device to the intent broker.

16. The system of claim 15, wherein the user-intention category is enhanced with one of payment card analytics, user profile data, transaction history data, general demographic data, and data from merchants.

17. The system of claim 10, wherein the user-intention category is based on one of the following that is received from the electronic device by the intent broker:
payment card analytics,
user profile data,
transaction history data,
general demographic data, and
data from merchants.

18. A non-transitory computer readable storage medium, including instructions stored thereon for communicating an anonymized user intent, which when read and executed by one or more computers cause the one or more computers to perform steps comprising:

in a networked computer platform including an intent broker and a supply-side information processing apparatus comprising at least one computer processor:

receiving, at the supply-side information processing apparatus and from a third-party application executing on an electronic device, personal data of a user of the electronic device;

identifying, by the supply-side information processing apparatus and based on the personal data of the user of the electronic device, a user identifier, wherein the user identifier is associated with the user of the electronic device;

receiving, by the intent broker, user intention information;

storing, by the intent broker, the user intention information in a table of a user-specific database, wherein the user intention information is associated with the user identifier and an intent identifier, and wherein the intent identifier represents a user-intention category;

sending, by the supply-side information processing apparatus, the user identifier to the intent broker;

receiving, by the supply-side information processing apparatus and from the intent broker, the intent identifier;

communicating by the supply-side information processing apparatus, the user-intention category to a demand-side platform, the demand-side platform comprising a merchant;

receiving, by the supply-side information processing apparatus and from the demand-side platform, a digital intent-based transaction instrument that is associated with the user-intention category;

sending by the supply-side information processing apparatus, the digital intent-based transaction instrument that is associated with the user-intention category to the electronic device;

retrieving, by a point-of-sale device of the merchant, offer information from the digital intent-based transaction instrument using a near field communication connection with the electronic device; and applying, by the point-of-sale device, offer terms indicated in the offer information from the digital intent-based transaction instrument to a transaction.

* * * * *